(12) United States Patent
Rivas

(10) Patent No.: US 7,386,121 B1
(45) Date of Patent: Jun. 10, 2008

(54) HAND HELD COMMUNICATORS

(76) Inventor: Victor A. Rivas, P.O. Box 30711, Lincoln, NE (US) 68503

( * ) Notice: Subject to any disclaimer, the term of this patent is extended or adjusted under 35 U.S.C. 154(b) by 1100 days.

(21) Appl. No.: 09/906,851

(22) Filed: Jul. 18, 2001

Related U.S. Application Data

(60) Provisional application No. 60/218,825, filed on Jul. 18, 2000.

(51) Int. Cl.
  *H04M 1/00* (2006.01)
(52) U.S. Cl. .................. 379/451; 343/702; 455/575.5
(58) Field of Classification Search ............... 343/702; 379/451; 455/575.5
  See application file for complete search history.

(56) References Cited

U.S. PATENT DOCUMENTS

| | | | | |
|---|---|---|---|---|
| 4,803,724 A | * | 2/1989 | Utoh et al. ............ | 379/433.01 |
| 5,150,282 A | * | 9/1992 | Tomura et al. ............. | 361/818 |
| 5,177,660 A | * | 1/1993 | Kilner ........................ | 361/220 |
| 5,425,077 A | * | 6/1995 | Tsoi ............................ | 455/566 |
| 5,610,971 A | * | 3/1997 | Vandivier ................. | 455/569.2 |
| 5,787,340 A | * | 7/1998 | Sepponen ................. | 455/575.5 |
| 6,349,225 B1 | * | 2/2002 | Lands et al. ............. | 455/575.3 |
| 6,453,169 B1 | * | 9/2002 | Maloney ................... | 455/575.1 |
| 6,505,036 B2 | * | 1/2003 | Zilberberg et al. .......... | 455/117 |
| 6,708,047 B1 | * | 3/2004 | Miller et al. ............. | 455/575.5 |
| 2001/0041545 A1 | * | 11/2001 | Liberman et al. | |

OTHER PUBLICATIONS

JP No. 6-268548 Mar. 15, 1993.*
B. Ram et al. Environmental performance of mobile products 1999 IEEE pp. 140-145.*

* cited by examiner

*Primary Examiner*—Quynh H. Nguyen
(74) *Attorney, Agent, or Firm*—James Creighton Wray; Clifford D. Hyra

(57) ABSTRACT

Rotatable easels position cellular telephones away from users' heads. Earpieces and microphones are on a shielded surface. Control keys and communications screens face away from a user. Back-to-back screens on opposite sides increase space for visual information and messages. Biodegradable, conductive shielded covers and cases and printed antennas protect users. Rubber grips and depressed conductive keys protect the equipment.

20 Claims, 14 Drawing Sheets

HAND HELD COMMUNICATORS

BACKGROUND OF THE INVENTION

This application claims the benefit of U.S. Provisional Application No. 60/218,825, filed Jul. 18, 2000.

The number of cellular phones sold annually has more than tripled during the past three years to more than 300 million worldwide. Ninety-four million Americans currently use cellular phones plus other wireless communication devices such as the internet, GPS, palm top computers, etc. Analysts predict that by the year 2003 there will be 1 billion cell phone users worldwide. In America alone there are an estimated 25 thousand new users per day. In addition, within six years, about 700 million people will reach the internet by mobile devices versus 500 million by fixed-line devices such as PC's. The merger of cell phone and internet service in one common wireless device is an operational necessity and communication companies are working hard to provide users with the best affordable devices. The purpose of this invention is to make a contribution to provide end users with ergonomic electromagnetic radiation safe wireless communication devices, e.g. cell phones.

Over 94 million Americans currently use cellular phones and other wireless communication devices, and there are an estimated 25 thousand new users per day. Because of the prevalence of the use of cellular phones and wireless communication devices, it is essential that the devices be made ergonomic and safe.

Cellular phones and other wireless communication devices generate radio frequency radiation (RFR) and electromagnetic (EMR) radiation as they function. Up to 60% of the radiation emitted by cellular phones is absorbed by the head and neck of the phone user. Exposure to these forms of radiation may have detrimental effects on the health of cell phone users. Recently, studies conducted on animals revealed that low level exposure to RFR and electromagnetic radiation may increase the risk of certain cancers. The health implications may be particularly strong for young adults and children because their brains and body systems are still developing and are especially sensitive to the deleterious effects of exposure to radiations.

In addition to the negative health effects caused by exposure to RFR and electromagnetic radiations, cellular phones may cause tissue damage to the eyes, ears, brain, face and neck of cellular phone users. This damage is thermal damage, due to the fact that cellular phones radiate heat while in use, raising the local temperature to levels that can cause acute injuries to tissue. The eyes and ears are especially prone to thermal damage from cell phone use because of their proximity to the phone and their limited cooling abilities.

Needs exist for a means to make wireless communication devices, e.g. cellular phones, safer by minimizing a user's exposure to the heat and RFR and electromagnetic radiation emitted by wireless communication devices, e.g. cellular phones.

SUMMARY OF THE INVENTION

The invention integrates EMI shielding technologies, biodegradable and non-degradable conductive materials, software, innovative electronic circuits to provide an ergonomic, inexpensive, user-friendly device.

The present invention is an apparatus specially designed to minimize a user's exposure to radio frequency radiation and electromagnetic radiation generated by wireless and wired communication devices, especially cellular phones. To redesign the wireless device to make it more ergonomically attractive by integrating features and functions in the back of the cellular phone such as the earpiece, microphone and screens, present limitations of wireless communication devices include small screens for mobile phones, limiting information display, poor screen quality, e-mail communication is difficult, and the key pad is difficult to use. Therefore, by having a bigger screen on the back, the wireless device becomes more technologically efficient. By having back-to-back screens, the wireless device becomes more efficient. In addition to having more space and power, the wireless communication device of the present invention is much more safer. Printed antennas, which have advantages over conventional antennas in terms of space reuse and aesthetics because of their compactness and thin profile, are within the scope of the present invention. Printed antennas may be mounted in cellular phones and palm top computers. These antennas may reduce weight by reusing space via vertical stacking.

Exposure is minimized by keeping a space of approximately 30 mm between the speaker of the cellular phone and the ear of the phone user, and by placing all of the radiation-generating components of the cellular phone as far from the head and neck of the phone user as possible.

An electronically conductive enclosure (FIG. 1) prevents effects of electromagnetic radiation on humans and sensitive electronic circuits. To achieve this, the plastic enclosure incorporates conductive materials as mentioned in the Rivas et al. U.S. Pat. No. 5,904,980. Other material to perform the conductive additive function is a non-metallic carbon base renewable conductive additive that, when combined with biodegradable plastic, makes a 100% biodegradable conductive electronic enclosure. This unique feature protects the wireless communication device user from electromagnetic radiation, and protects sensitive electronic enclosures from electromagnetic interference and protects the environment.

The essential feature of such conductive carbon-base material is the repeating C=C—C unit. When this material is subsequently treated by addition of positive or negative ions, the material becomes highly conductive. A plastic wire made with this material reduces weight and power consumption in an electronic communication device, making the device, such as cellular phones, safer. Furthermore, using this material in a fiber form in an injection-molded process to make the cellular phone conductive enclosure results in a lighter, stronger case. The invention therefore provides an inexpensive, light-weight, water-proof electromagnetic radiation shielded enclosure for electronic communication devices.

A conductive or non-conductive plastic easel, preferably approximately 30 mm long, is attached to the cellular phone to facilitate keeping the phone, and hence the radiations generated by the phone, away from the ear. In addition to cellular phones equipped with the easel at the time of manufacture, the easel may be retrofitted onto existing cellular phones.

A preferred embodiment of the cellular phone of the present invention incorporates an extended rotating (approximately, but not limited to, 270° rotation) plastic easel. The easel preferably rotates counterclockwise from the front to the back of the phone where the earpiece and microphone is located. This back-to-back concept may be extended to include other features, for example but not limited to, bigger screens. The easel provides a physical barrier to keep the ear from making close contact with the speaker of the phone.

The easel preferably places the cellular phone at a distance of, for example, approximately 30 mm, from the head of the phone user. The purpose of the easel is to put enough distance between the brain and the earpiece speaker of a cellular phone to reduce the amount of radiation and electromagnetic interference to which the phone user is exposed. Other ways to put an easel on a cellular phone other than rotating it from the front to the back are within the scope of this invention.

Other features of the specially designed cellular phone of the present invention include placing the speaker and microphone in the back of the phone away from the ear, and ergonomic rubber grips for preventing physical abuse. The back of the cellular phone or other wireless communication device may be used for additional space for bigger screens. This is particularly important when the wireless communication device combines cellular phone and internet features. Back-to-back screens come in handy; one screen in the front is for cellular features, and one in the back is for internet functions. The same concept may be extended to other communication devices such as palm top computers, pagers, calculators, etc. A combination of screens accommodates more flexibility.

Rubber grips may be attached to the cellular phone of the present invention to protect the cell phone from physical abuse and provide a comfortable grip. The rubber grips may be attached to any side of the cellular phone, as for example, to the top and/or the bottom of the cellular phone. Another version of the invention is a cellular phone with the speaker located on a soft conductive rubber grip next to the screen and the microphone located in the lower part of the same grip.

The back of the cellular phone of the present invention is shielded from radio frequency radiations and electromagnetic interference by an electrically conductive biodegradable or non-degradable plastic, which reflects the electromagnetic radiations generated by the cellular phone away from the body, head and neck of the cellular phone user. The conductive plastic also provides electromagnetic interference shielding protection for sensitive electronic circuits. In addition, the conductive plastic promotes heat dissipation, thus aiding in avoiding injuries due to thermal damage. Depressed rubber phone keys for the cellular phone of the present invention are made with conductive rubber to enhance heat dissipation and electromagnetic radiation shielding.

In a preferred embodiment a user operates the cellular phone of the present invention by pressing a power lever to turn on the cellular phone and to quickly release the easel. The easel may be spring-loaded so that it is automatically put into place when the power lever is pressed. The easel automatically rotates counterclockwise approximately 270° to a position perpendicular to the back plastic plate, which faces the head of the cellular phone user. This keeps the speaker and circuitry of the cellular phone approximately 30 mm from the ear, preventing radio frequency power deposition in the brain.

The electrical conductivity of the plastic laminate on the back of the cellular phone reflects and absorbs radio frequency radiation away from the cellular phone user. In addition, this electrical conductivity characteristic allows better heat dissipation, which augments heat dissipation by keeping a space between the ear and the speaker, which is located on the back of the phone. The space allows air convection to dissipate the heat.

The cellular phone may be turned off by pressing the power lever, putting down the antenna and bringing the easel back to its closed position. This process is quick and, for example, takes approximately three seconds.

Existing cellular phones may be retrofitted with an easel to facilitate spacing between the cellular phone and the ear of the user to minimize exposure to radio frequency radiation and electromagnetic interference generated by the cellular phone. The easel, preferably approximately 30 mm long, may be attached to cover the screen of the cellular phone when the phone is not in use. Alternatively, the easel may be attached to the top, bottom, or sides of the cellular phone or at any point around the earpiece speaker.

In a preferred embodiment in which the easel is attached to the top of a cellular phone, the easel preferably rotates 90° when a phone user turns the power on, making the easel perpendicular to the front of the phone, which faces the head of the phone user. The easel may be spring-loaded so that it is automatically put into place when the phone user turns the phone on. This easel provides distance between the ear and the speaker, which is located just below the screen. The microphone of currently available phones is located in the lower part of the outside front of the phone.

The back and/or the front of the cellular phone where the earpiece is located may be laminated with conductive plastic to aid in dissipating heat and reducing electric field strength and electromagnetic interference. The rubber phone keys may be made of conductive rubber to enhance heat dissipation and to shield against electromagnetic radiations.

In another embodiment of the invention, the speaker is located on the soft conductive rubber grip next to the screen, and the microphone is located within the lower portion of the rubber grip. The cellular phone may have dual screens front and back for cellular phone/palm top computer interactions.

It is not necessary to make big investments to retool the making of circuitry of currently available cellular phones; the electronic enclosure of the phones may be retrofitted by externally adding the easel concept inexpensively.

These and further and other objects and features of the invention are apparent in the disclosure, which includes the above and ongoing written specification, with the claims and the drawings.

DETAILED DESCRIPTION OF THE PREFERRED EMBODIMENTS

The present invention, as shown in FIGS. 1-5, is an apparatus specially designed to minimize a user's exposure to radio frequency radiation and electromagnetic radiation generated by wireless and wired communication devices, especially cellular phones 1 and to provide space for dual screens. Exposure is minimized by keeping a space of approximately 30 mm between the speaker 24 of the cellular phone 1 and the ear of the phone user, and by placing all of the radiation-generating components of the cellular phone 1 as far from the head and neck of the phone user as possible. A conductive or non-conductive plastic easel 2, preferably approximately 30 mm long, is attached to the cellular phone 1 to facilitate keeping the phone 1, and hence the radiations generated by the phone 1, away from the ear, head, face, neck and brain. In addition to cellular phones 1 equipped with the easel 2 at the time of manufacture, the easel 2 may be retrofitted onto existing cellular phones 1.

Preferably, the easel 2 places the cellular phone 1 at a distance of approximately 30 mm from the head of the phone user. The purpose of the easel 2 is to put enough distance between the brain and the earpiece speaker 24 of a cellular phone 1 to reduce the amount of radiation and electromagnetic interference to which the phone user is exposed. There are other ways to put an easel 2 on a cellular phone 1 other than rotating it from the front to the back.

Figure 1:
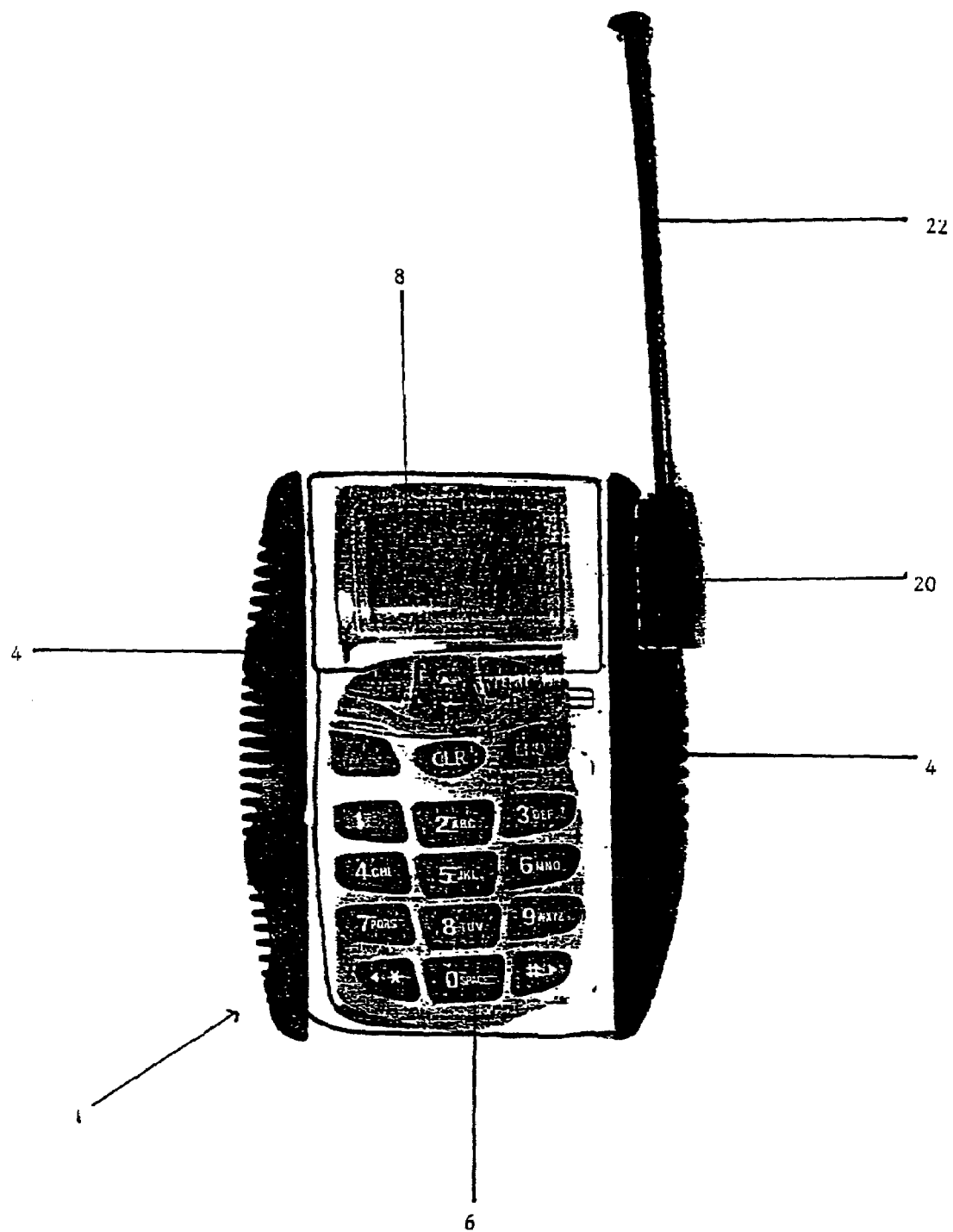
FIG. 1 is a top elevation view of the cellular phone of the present invention.
Figure 2:
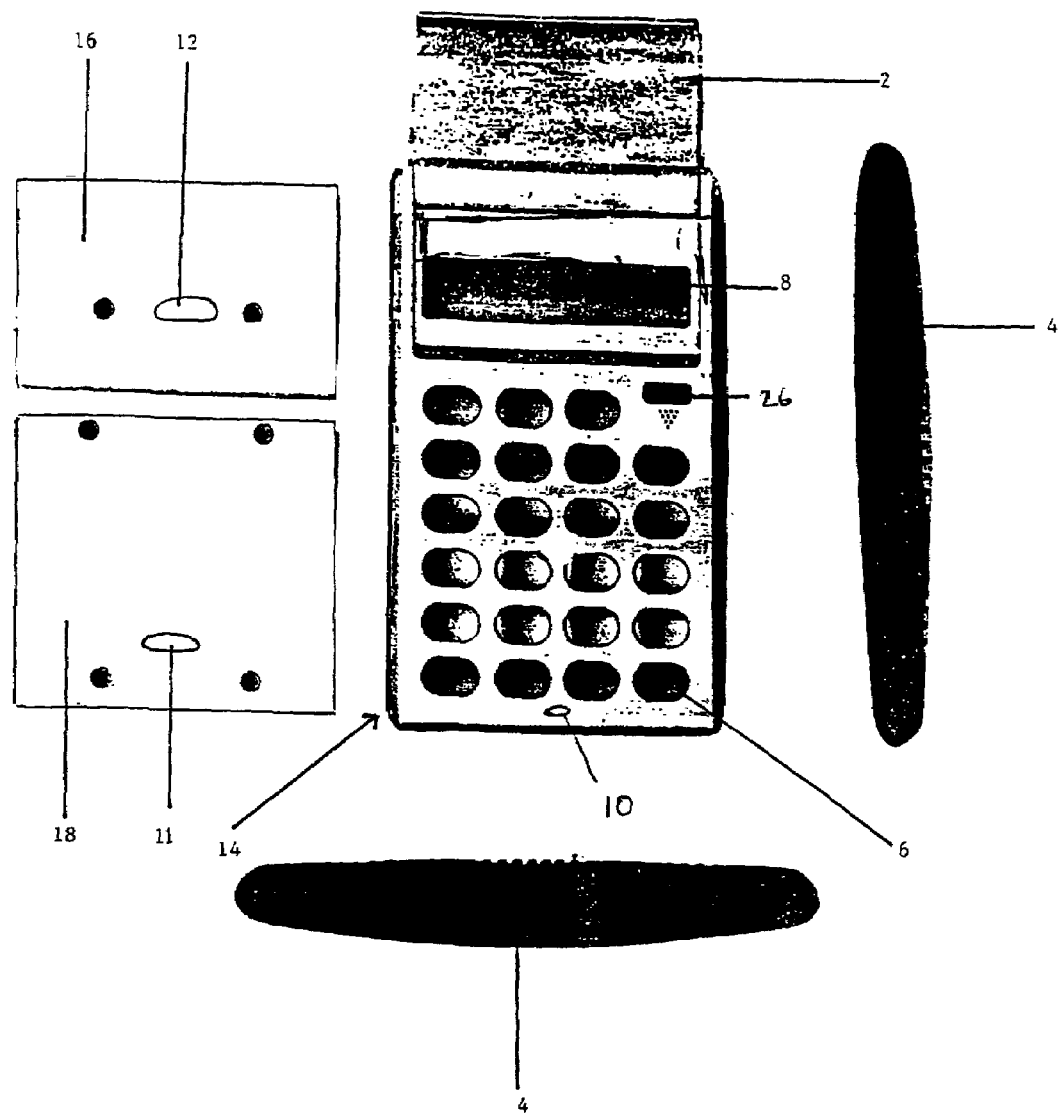
FIG. 2 is a top elevation view of the front of the components of the cellular phone of the present invention.

FIGS. 1 and 2 show the cellular phone 1 of the present invention in use. A preferred embodiment of the cellular phone 1 of the present invention incorporates an extended rotating (approximately 270° rotation) plastic easel 2. The easel 2 may rotate counterclockwise from the front to the back of the phone 1, providing a physical barrier to keep the ear from making close contact with the speaker 24 of the phone 1. The phone 1 comprises rubber alpha-numeric keys 6 for entering data into the phone 1, a screen 8 for displaying received or transmitted information, and an antenna 22 which is collapsible into an antenna support 20. The alpha-numeric keys 6 may be constructed of conductive rubber to aid in heat dissipation. Protective rubber grips 4 are located on sides of the phone 1 to protect against physical abuse and to provide a comfortable grip. The grips 4 may also be mounted on the top and/or the bottom of a cellular phone 1.

Figure 3:
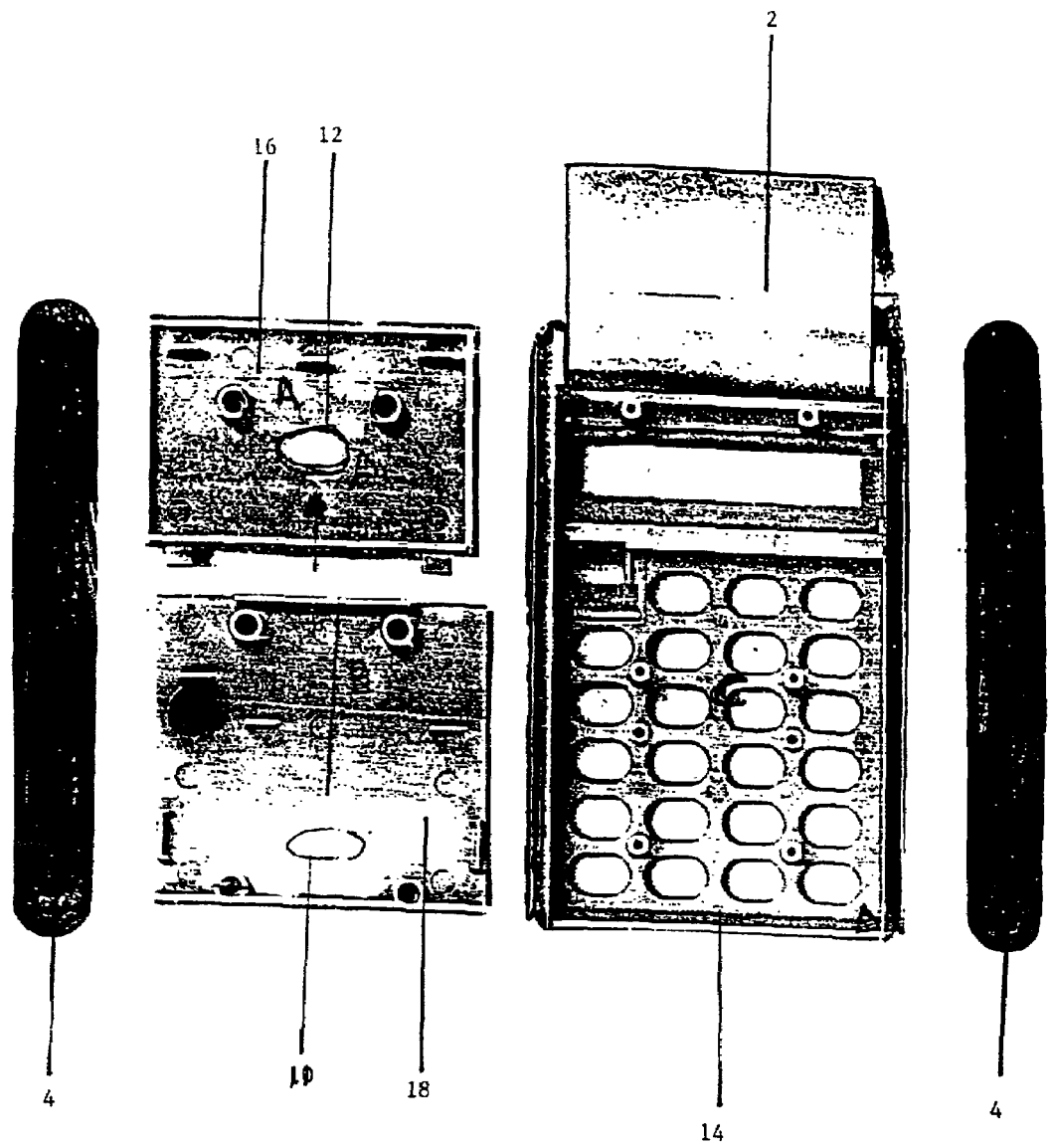
FIG. 3 is a top elevation view of the back of the components of the cellular phone of the present invention.

FIGS. 2 and 3 show the components of the cellular phone of the present invention. FIG. 2 shows the front sides of the components of the cellular phone 1 of the present invention, and FIG. 3 shows the back sides of the components. Plastic plates 16, 18 are mounted on the back of the cellular phone 1. The lightweight and waterproof plastic plates 16, 18 may be constructed of biodegradable electromagnetic interference (EMI) shielded plastics, petroleum-based EMI shielded plastics or recyclable EMI shielded plastics. The top plate 16, incorporates an earpiece 12 through which amplified sound passes. The bottom plate 18 incorporates a hole 11 so that sound may easily pass to the microphone 10. A front plate 14 encases the inner circuitry of the cellular phone 1 and incorporates rubber alpha-numeric keys 6, which may be constructed of conductive rubber to augment heat dissipation, a power lever 26, and a screen 8. The front plate 14 may also be constructed of EMI shielding, lightweight and waterproof biodegradable plastics, petroleum-based plastics or recyclable plastics.

In a preferred embodiment, an easel 2 is attached to the top of the front plate 14; the easel 2 covers the screen 8 when the phone 1 is not in use, and rotates approximately 270° to a position perpendicular to the top back plate 16 when the phone is in use. The easel 2 keeps the circuitry of the cellular phone 1 away from the phone user's ear preventing radio frequency energy and heat from interacting with the head, brain, face and neck of the phone user. The placement of the easel 2 is not limited to the top of the cellular phone, however. The easel 2 may be attached to the phone on either side of the speaker 24, at the bottom of the phone 1, or at any point surrounding the earpiece 12.

Figure 4:
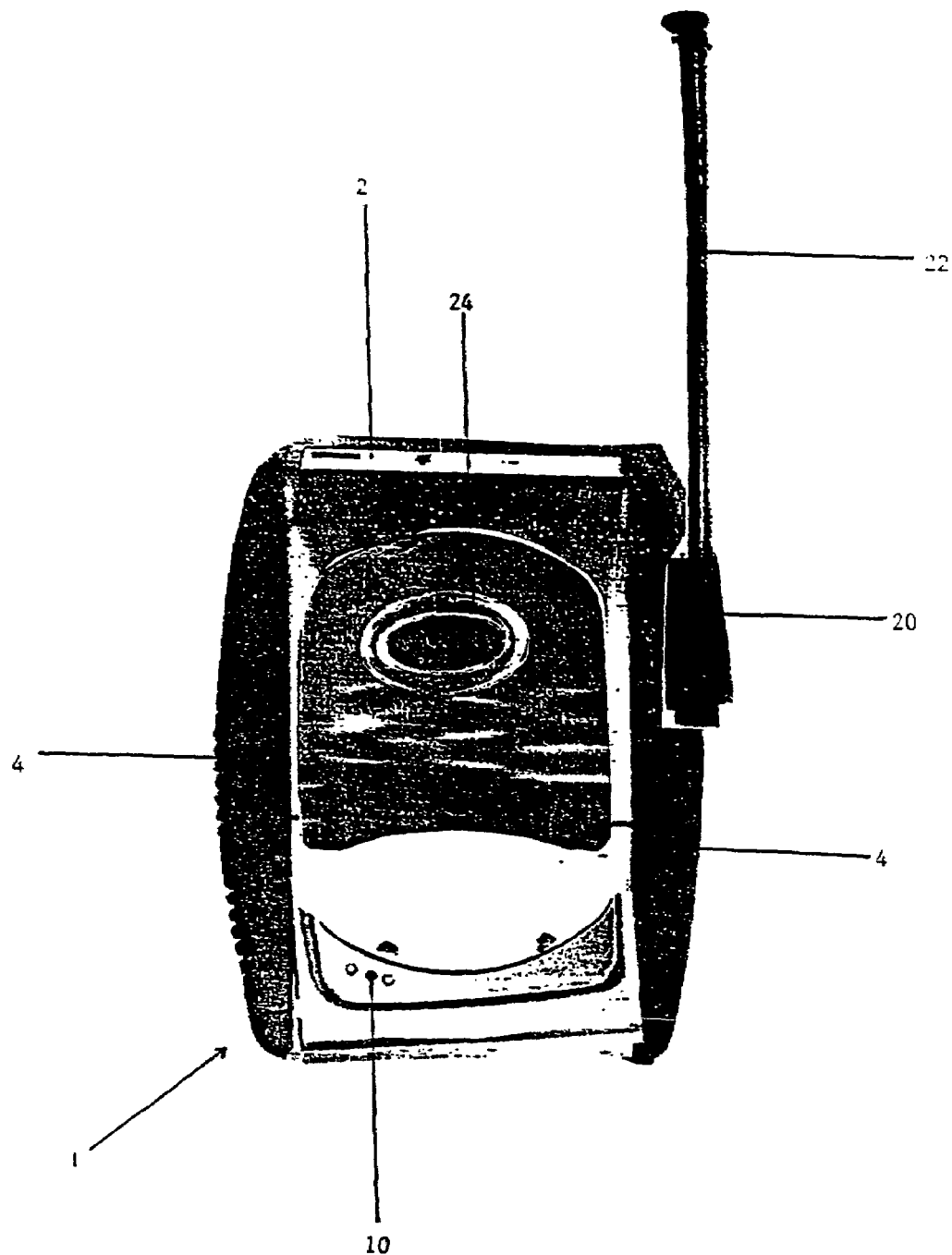
FIG. 4 is a top elevation view of the back of the cellular phone of the present invention when it is in use.

The back of a preferred embodiment of a cellular phone 1 of the present invention is shown in FIG. 4. The phone 1 is shown in use. A short antenna 22 constructed of biodegradable conductive plastics or of traditional materials is collapsible within an antenna support 20. The plastic easel 2 is perpendicular to the vertical axis of the phone 1, providing a means for facilitating keeping a space between the speaker 24 and the ear, head, face, neck and brain of the cellular phone user. Ergonomic soft rubber grips 4 are mounted on either side of a preferred embodiment to protect the cellular phone 1 from physical abuse and mishandling. A microphone 10 is located in the lower portion of the phone 1; the microphone 10 may be located on either side or in the middle of the phone 1.

Figure 5:
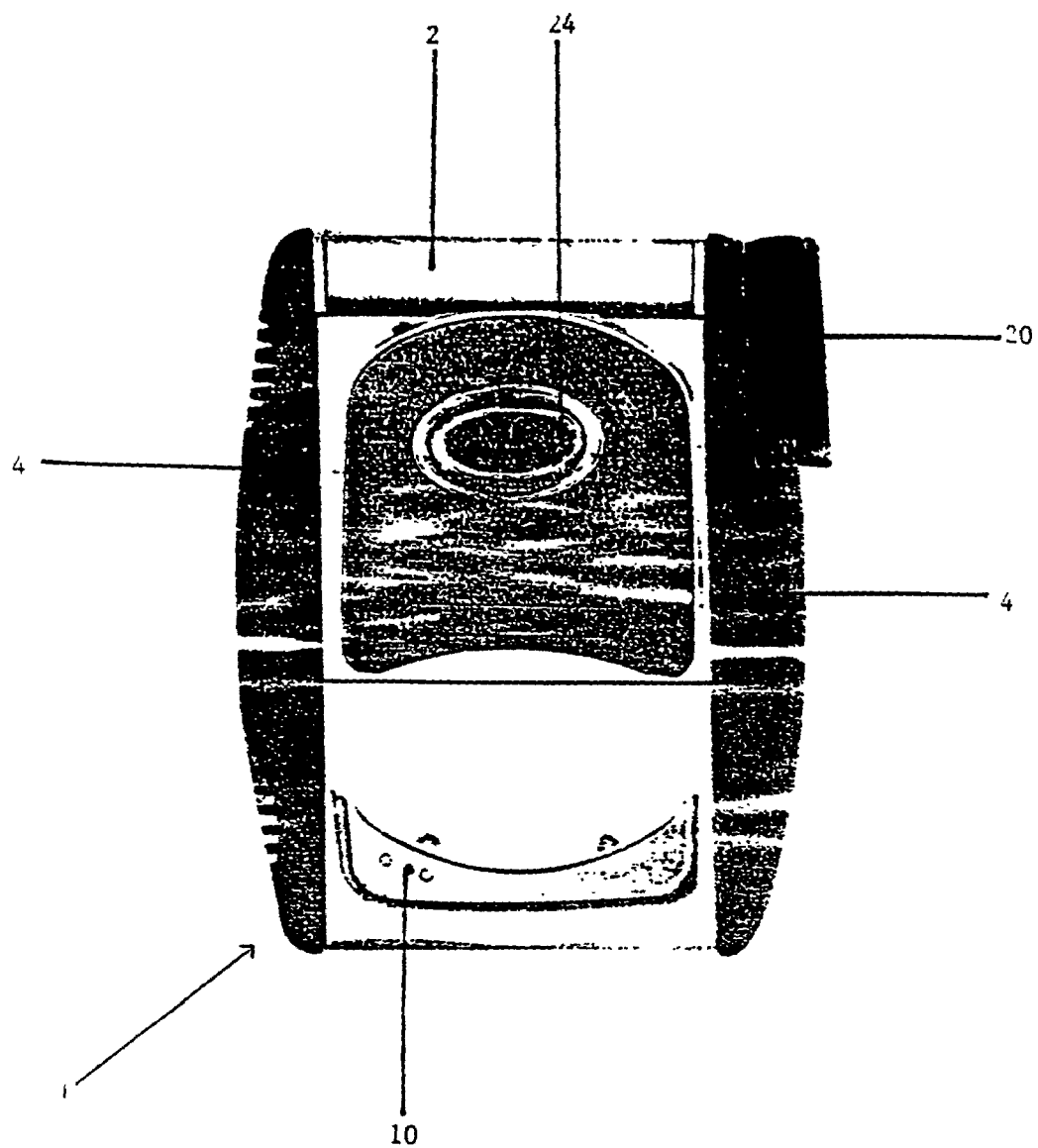
FIG. 5 is a top elevation view of the back of the cellular phone of the present invention when it is not in use.

FIG. 5 shows the back side of a preferred embodiment of the cellular phone 1 of the present invention when the phone 1 is not in use. The easel 2 is attached to the top of the back of the phone 1, and folds over to cover a screen 8 located on the front of the cellular phone 1. The antenna 22 is collapsed into the antenna support 20 for protection. Rubber grips 4 are mounted on either side of the phone 1 to protect against damage and to provide a comfortable grip.

Figure 6:
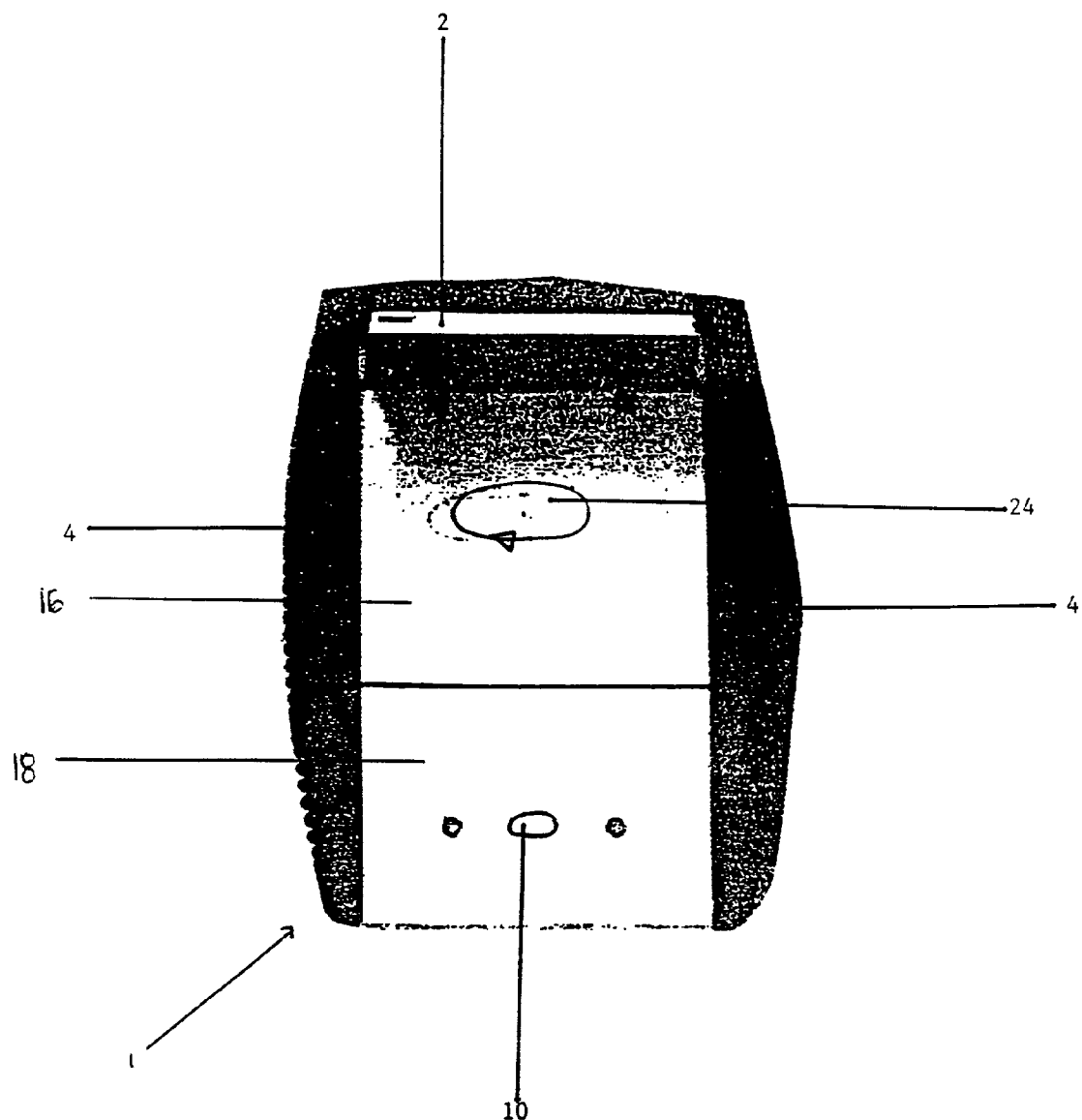
FIG. 6 is a top elevation view of the back of the cellular phone of the present invention.

The back side of an alternate embodiment of the cellular phone 1 of the present invention is shown in FIG. 6. Plastic plates 16, 18 cover the circuitry of the cellular phone. A speaker 24 is integrated into the top plastic plate 16 for amplifying sound, and a microphone 10 is incorporated into the bottom plastic plate 18. The plastic plates 16, 18 may be constructed of biodegradable EMI shielded plastics, petroleum-based EMI shielded plastics, recyclable EMI shielded plastics or other materials. An easel 2 is mounted on the top of the cellular phone 1 to facilitate keeping a space between the speaker 24 and the ear of the phone user. The easel 2 may be mounted on the top, bottom, or sides of the cellular phone, or at any point surrounding the earpiece. When the phone 1 is in use, the easel 2 is perpendicular to the vertical axis of the phone 1. Rubber grips 4 are mounted on both sides of the cellular phone 1. Additional rubber grips 4 may be mounted on the top and/or bottom of the cellular phone 1.

Figure 7:
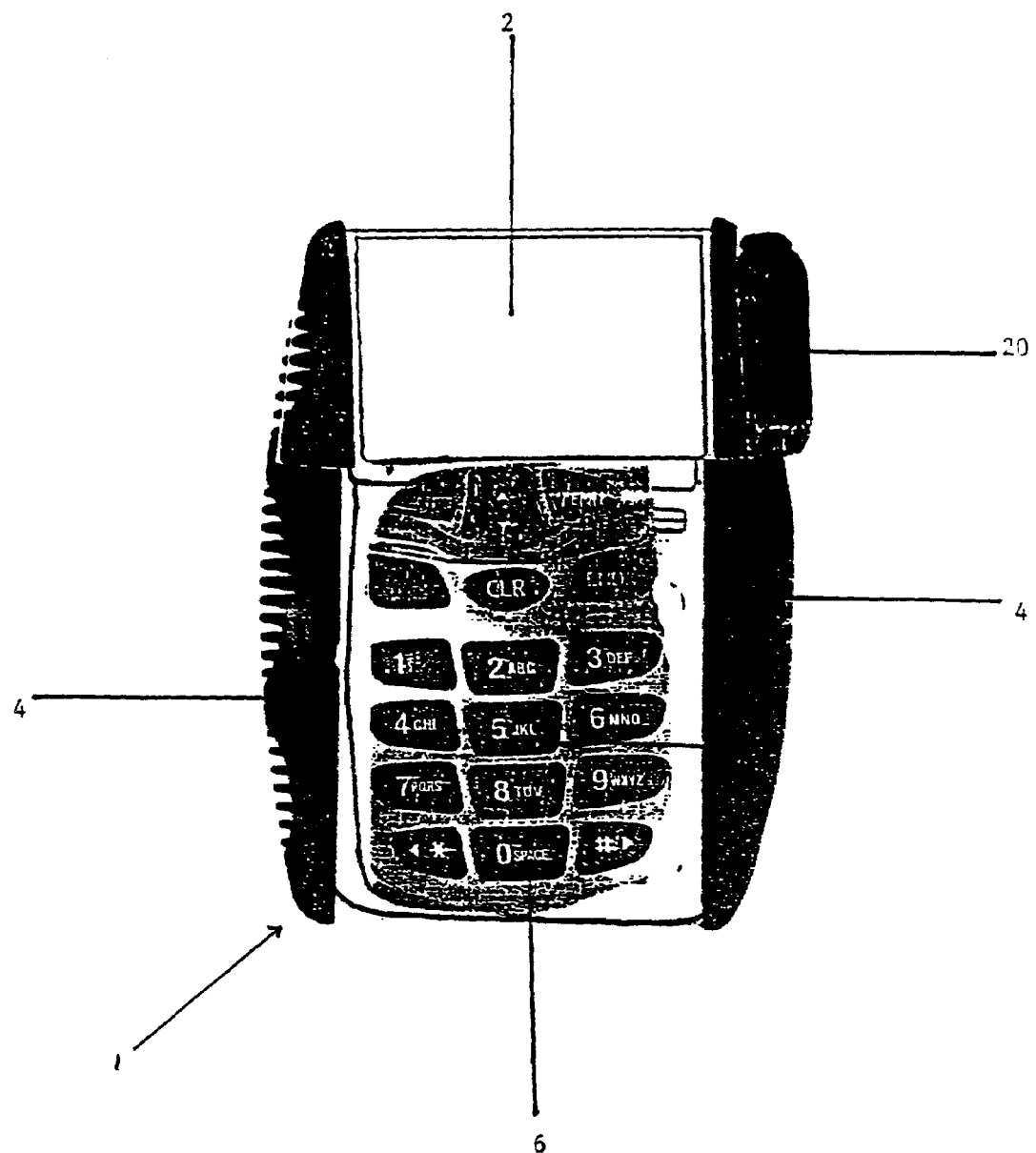
FIG. 7 is a top elevation view of the front of the cellular phone of the present invention when it is not in use.

The front of a preferred embodiment of the cellular phone 1 of the present invention is shown in FIG. 7. The phone 1 is not in operation. An easel 2 is folded into its stored position, flush with the front of the phone 1. Alpha-numeric keys 6 are located on the front of the phone 1 for entering data. Rubber grips 4 are mounted on both sides of the phone 1 to protect against physical damage. Additional grips 4 may be mounted on the top and/or bottom of the phone 1. An antenna support 20 is mounted on the side of the phone 1 for housing and supporting an antenna.

Figure 8A:
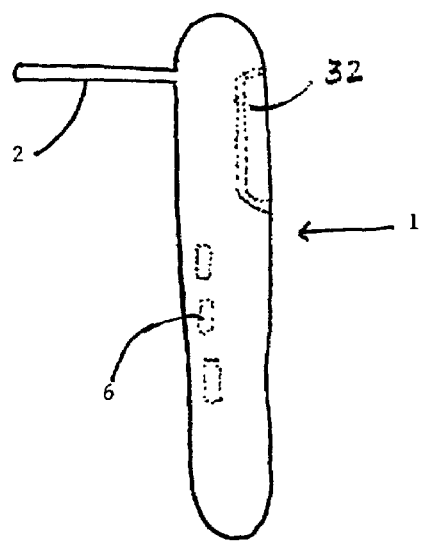
FIGS. 8A-8D are schematic side views of the cellular phone of the present invention.
Figure 8B:
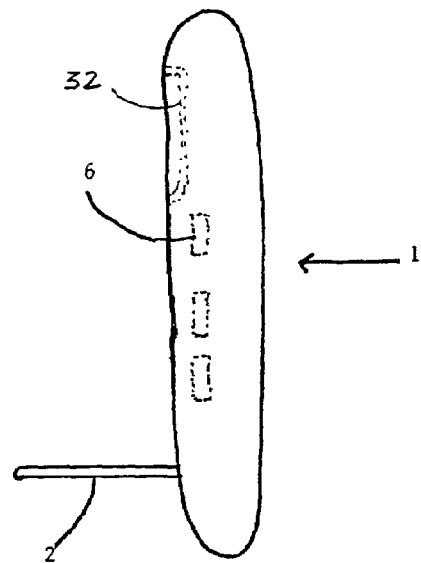
Figure 8C:
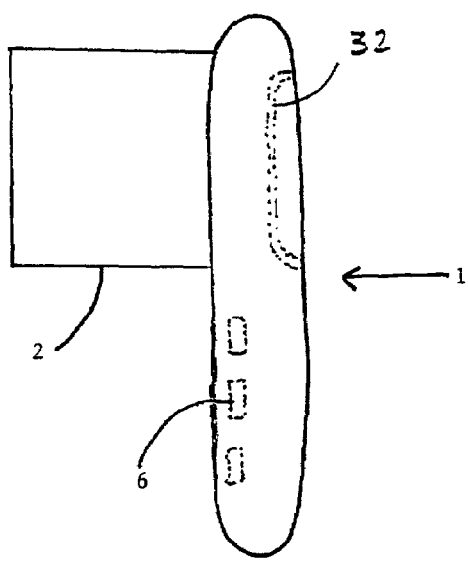
Figure 8D:
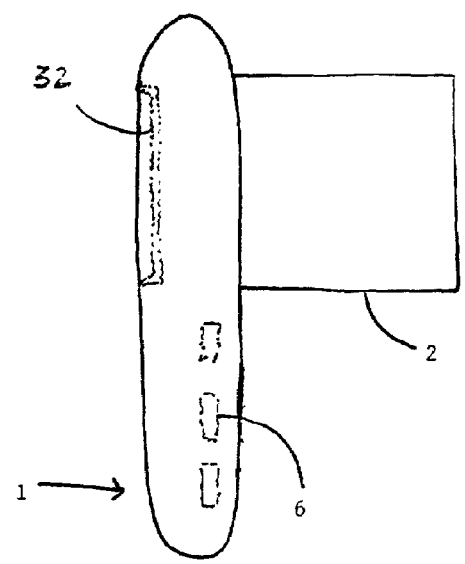

FIGS. 8A-8D show different ways of attaching an easel 2 to the cellular phone 1 of the present invention. FIG. 8A shows a cellular phone 1 with the easel 1 attached at the top of the phone 1, below the rubber grip level, the alpha-numeric symbols 6 indicating the dialing keys may be recessed to protect them from impact and damage. The screens in the front and back 32 are also positioned to protect them from impact by having the rubber grip higher than the keys and screens. These items do not touch (keep contact) with any surface and can be placed on a table without any worry of damage. The rubber grip may be all around the wireless communication device, above the alpha-numeric keys 6. FIG. 8B shows a cellular phone with the easel 2 attached at the bottom of the cellular phone 1, below the alpha-numeric keys 6. FIG. 8C shows a cellular phone 1 with the easel 2 attached on the left side of the phone 1, and FIG. 8D shows a cellular phone 1 with the easel 2 attached on the right side of the phone 1. These are examples of easel 2 placement; the easel 2 may be placed anywhere on the phone 1 to facilitate keeping a distance between the phone 1 and the phone user.

The purpose of the easel 2 is to keep a distance of preferably approximately 30 mm between the phone 1 and the phone user. Keeping this space allows electromagnetic energy and heat to dissipate before it affects the phone user. Air convection dissipates the heat.

Figure 9:
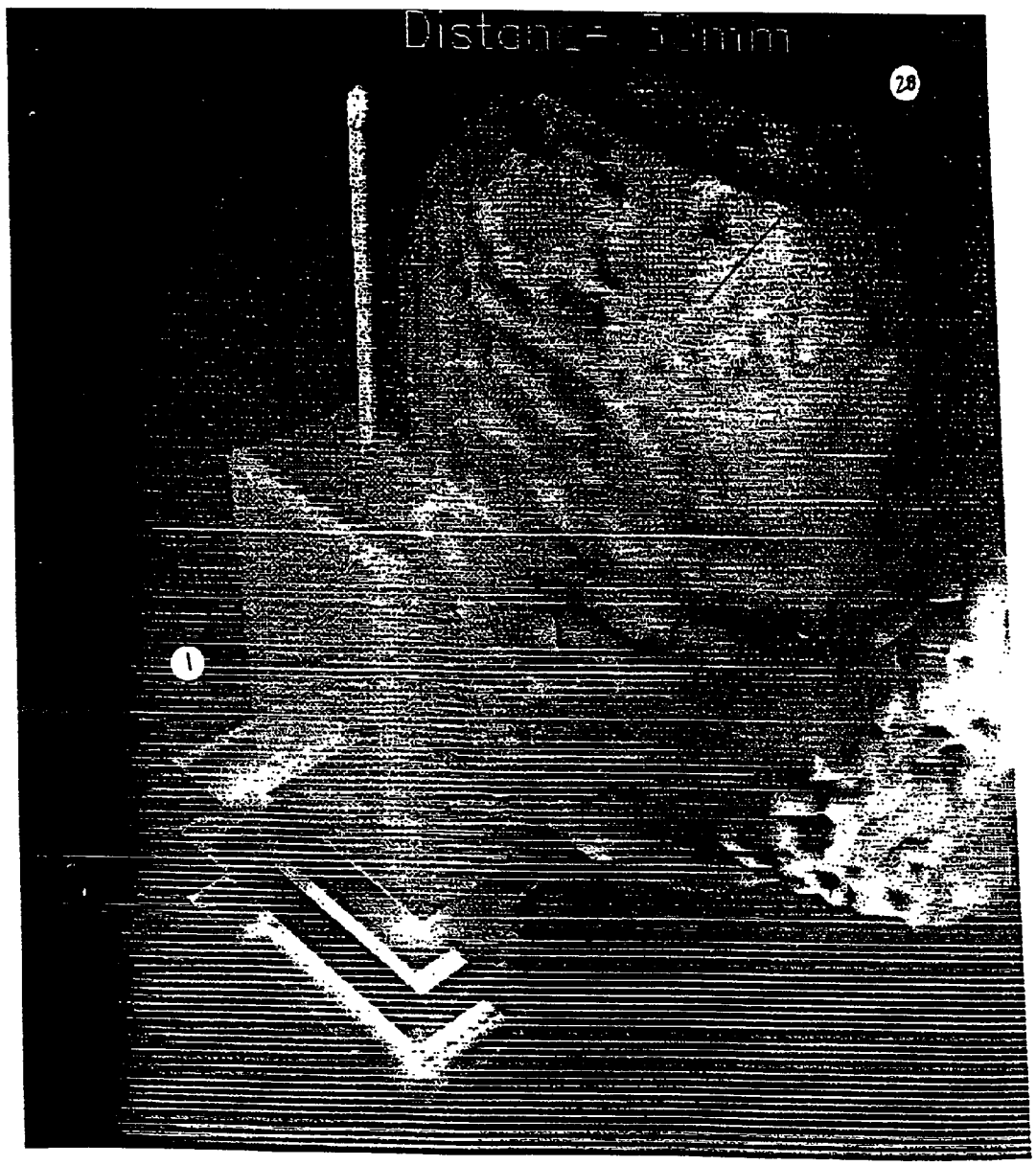
FIG. 9 is a computer-generated model of a cellular phone transmitting in the vicinity of a human head.

FIG. 9 shows a computer-generated model of a hand-held cellular phone 1 transmitting in the vicinity of a human head 28. The model shows that no energy is absorbed by the head 28 when the phone 1 is at a distance of 30 mm.

Figure 10:
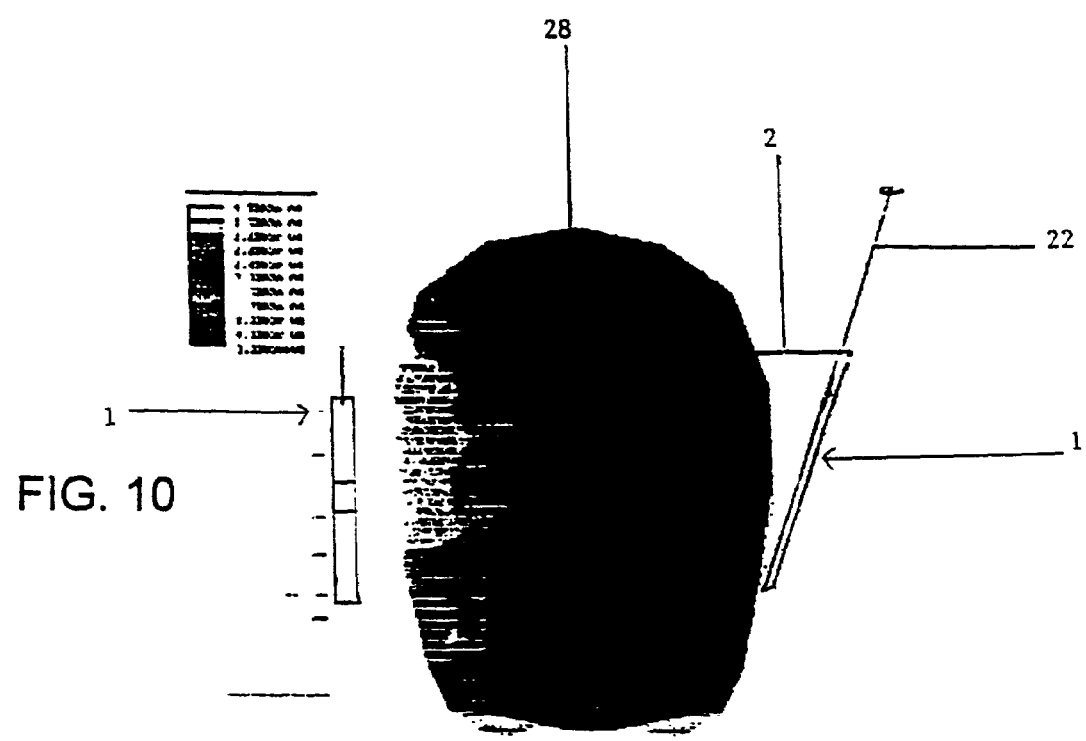
FIG. 10 is a computer-generated model of a human head comparing the amount of power absorbed from a traditional cellular phone and the cellular phone of the present invention.
Figure 11:
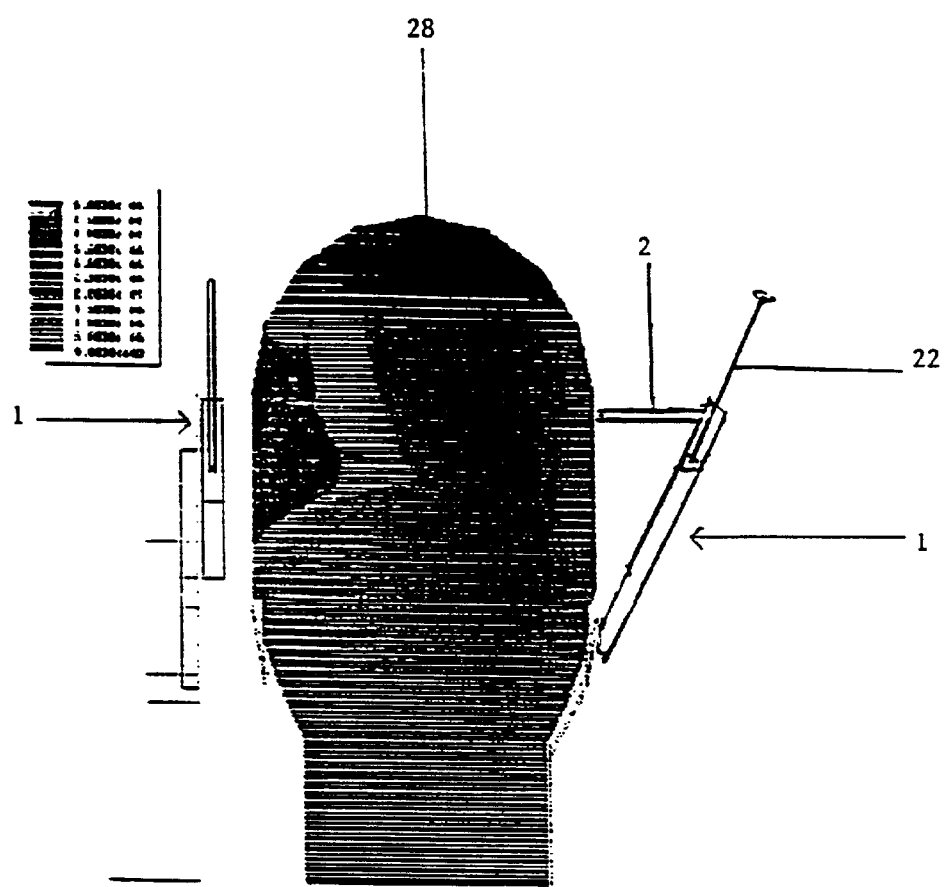
FIG. 11 is a computer-generated model of the front view of a human head, comparing the power absorbed from a traditional cellular phone and the cellular phone of the present invention.

FIGS. 10 and 11 show computer-generated models of a human head 28. FIG. 10 shows a back view of the head 28, and FIG. 11 shows a front view of the head 28. The left side of the head 28 has been exposed to the transmissions of a traditional cellular phone 1, and the right side of the head 28 has been exposed to the transmissions of a cellular phone 1 equipped with an easel 2 to keep a space of approximately 30 mm between the head 28 and the phone 1. The left side of the head 28 absorbed power from the cellular phone 1, but the right side of the head 28 is unaffected by the transmissions of a cellular phone 1 equipped with an easel 2.

Figure 12:
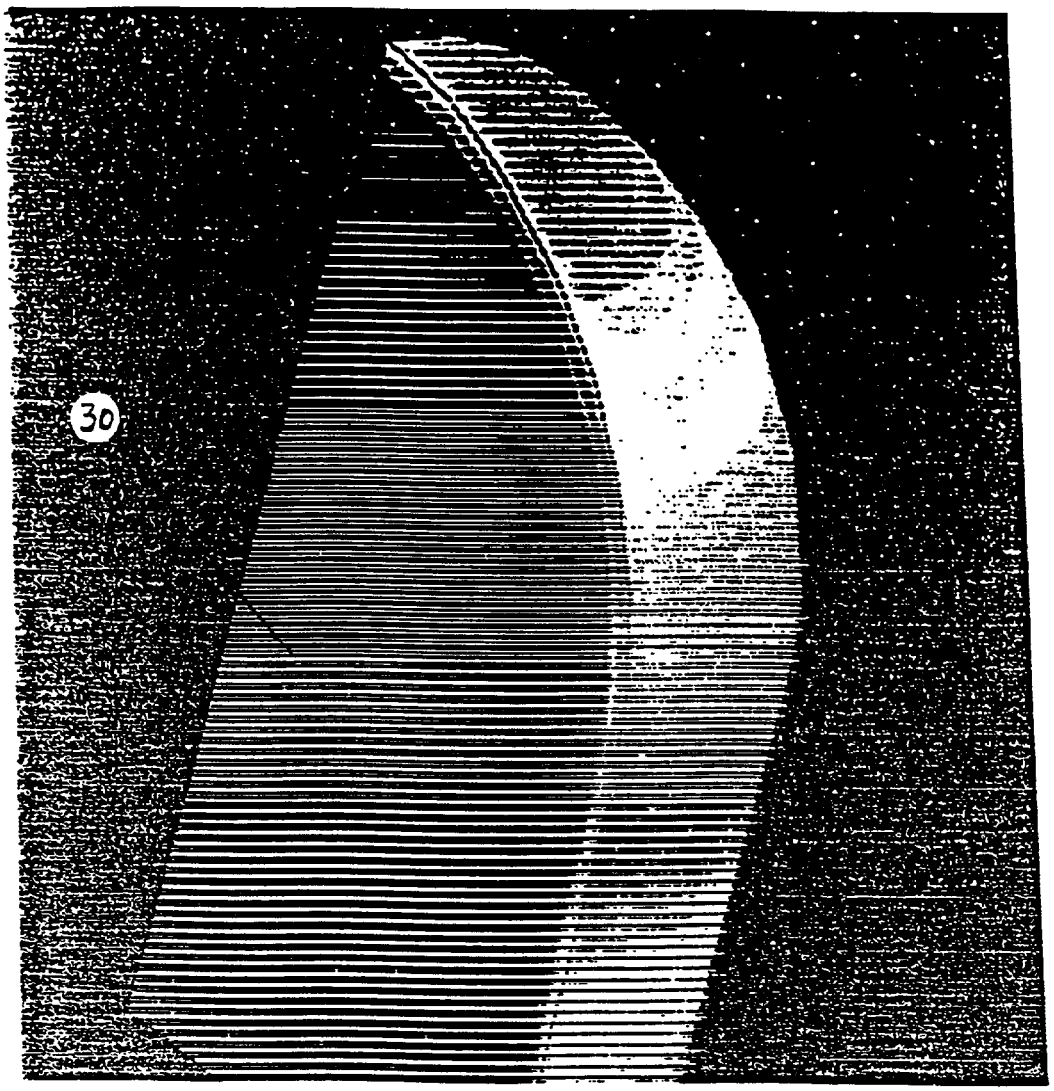
FIG. 12 is a computer-generated model of a chain of two cells immersed in a conductive medium membrane potential in a two cell chain in an electric field.

A portion of an electric field 30 generated by a cellular phone 1 is shown in FIG. 12. Using a cellular phone 1 equipped with an easel 2 and shielded against electromagnetic interference, the electric field 30 is reduced.

Figure 13:
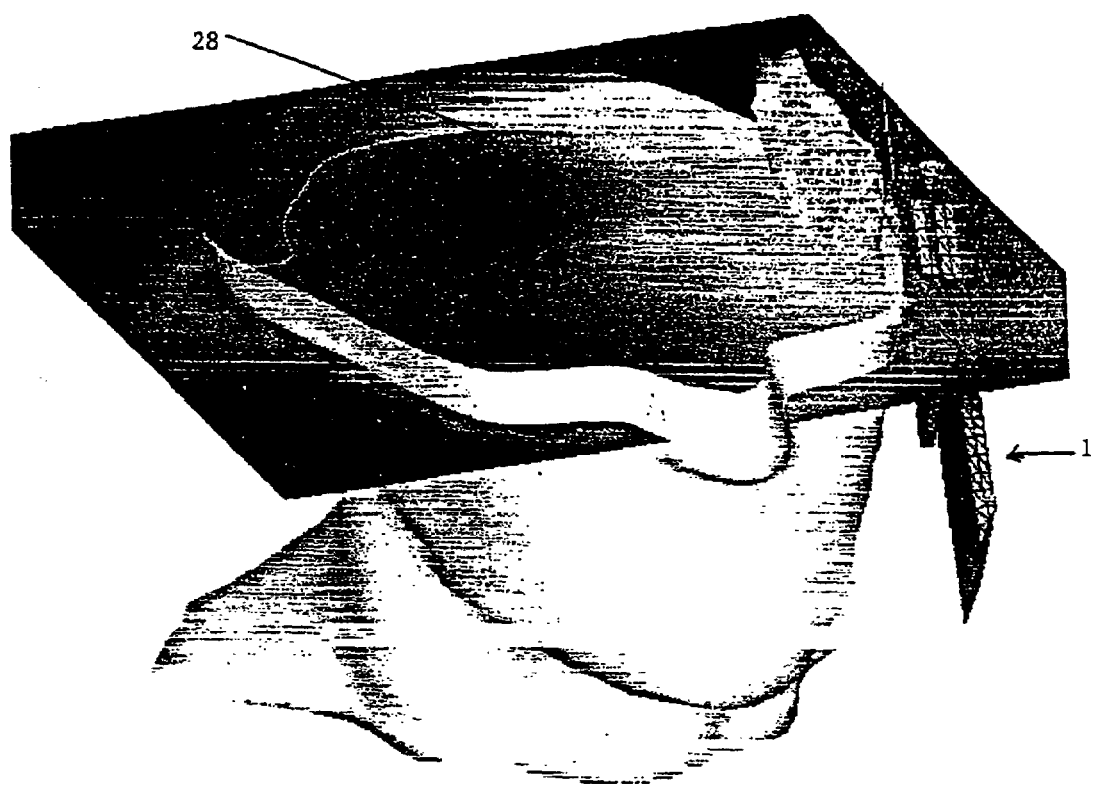
FIG. 13 is a computer-generated model of a human head showing the power absorbed from traditional cellular phones.

FIG. 13 shows a computer-generated model of a human head 28 in cross-section. The model shows the amount of power absorbed by the head 28 while using a traditional cellular phone 1 without an easel. Using a cellular phone 1 equipped with an easel 2 prevents this power absorption.

Figure 14:
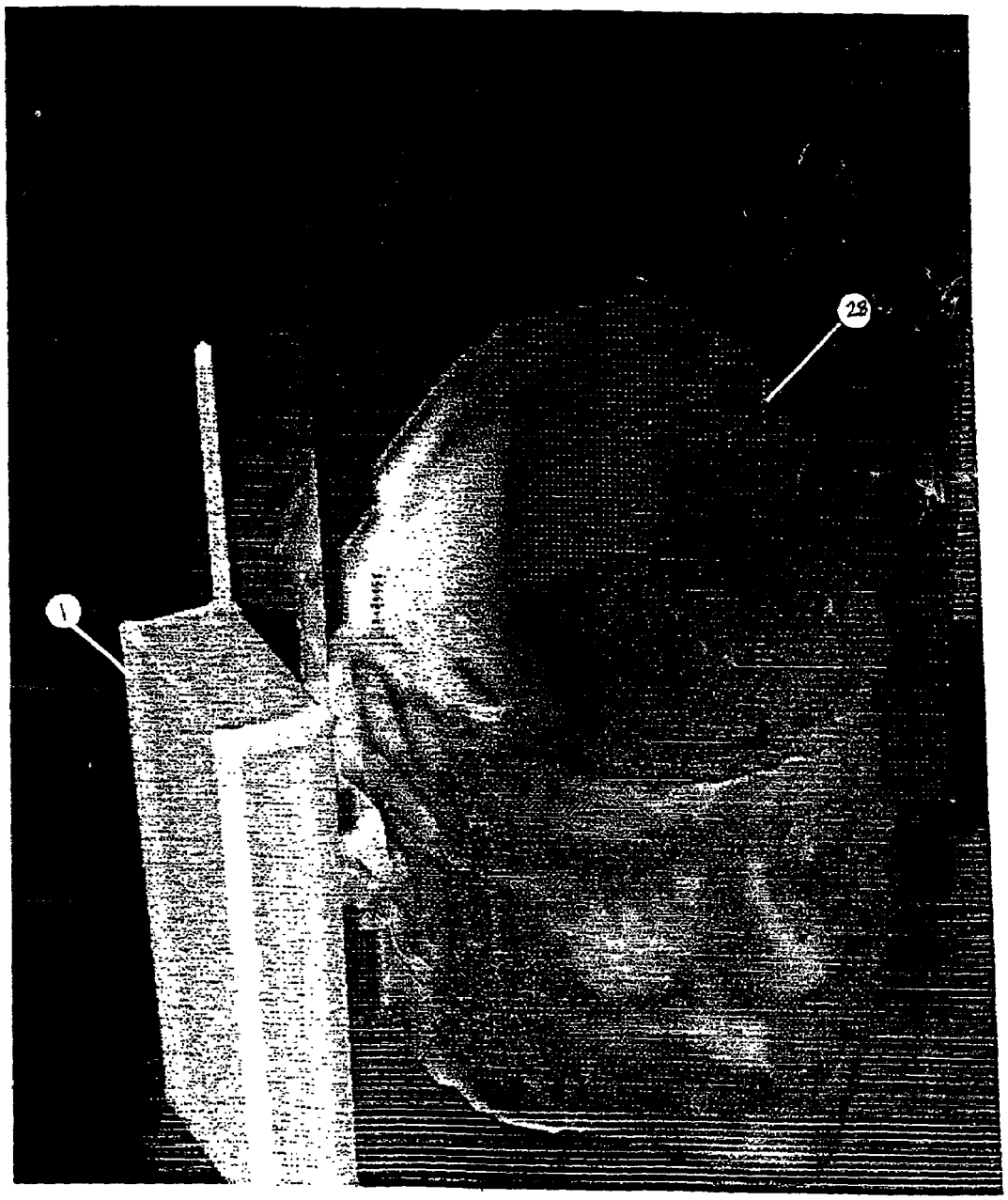
FIG. 14 is a computer-generated model showing the amount of radio frequency power from a PCS cellular phone deposited inside a human head.

FIG. 14 shows a computer-generated model of a human head 28 showing the amount of radio frequency radiation absorbed by the head 28 while using a traditional cellular phone without an easel 2.

While the invention has been described with reference to specific embodiments, modifications and variations of the invention may be constructed without departing from the scope of the invention, which is defined in the following claims.

I claim:

1. Telephone apparatus comprising:
   a hand held case made of biodegradable conductive plastic;
   an antenna mounted on the case;
   electronics mounted within the case;
   control keys mounted on one surface of the case for controlling the electronics within the case;
   a speaker mounted on the case and a microphone mounted on the case for respectively converting electronic signals to sounds and vice versa; and
   a spacer easel movably connected to the case for lying adjacent the case when the electronics are not in use, and for deploying to a human body member spacing position when the electronics are in use for spacing the speaker and sources of radiation related to the electronics and the antenna away from the human body member during use, the easel rotating about 270° around a hinge on a top of the cellular telephone for a closed position along one side of the cellular telephone to an open position about 90° from an opposite side of the phone when the cellular telephone is in use for talking and listening by a user.

2. The apparatus of claim 1, wherein the antenna further comprises a printed antenna mounted on the case at a position away from the speaker and the microphone.

3. The apparatus of claim 1, wherein the case is made of a conductive plastic material.

4. The apparatus of claim 1, wherein the case is made of a biodegradable conductive plastic material.

5. The apparatus of claim 1, wherein the control keys are recessed in a face of the case.

6. The apparatus of claim 1, further comprising conductive plastic shielding material panels connected to the case.

7. The apparatus of claim 6, wherein the shielding panels have openings adjacent speakers and microphones.

8. The apparatus of claim 6, wherein the shielding panels have openings for receiving the control keys.

9. The apparatus of claim 1, further comprising elastomeric grips mounted on side or top and bottom surface of the case for holding the case and protecting the case and its contents.

10. Telephone apparatus comprising:
    a hand held case made of biodegradable conductive plastic;
    an antenna mounted on the case;
    electronics mounted within the case;
    control keys mounted on one surface of the case for controlling the electronics within the case;
    a speaker mounted on the case and a microphone mounted on the case for respectively converting electronic signals to sounds and vice versa;
    a spacer easel movably connected to the case for lying adjacent the case when the electronics are not in use, and for deploying to a human body member spacing position when the electronics are in use for spacing sources of radiation related to the electronics and the antenna away from the human body member during use,
    wherein the human body member is a human head; and
    wherein the spacer easel is hinged at a hinged end to the case and extends at an acute angle nearly perpendicularly from the case in the deployed, spacing position and has a free edge opposite the hinged edge for lying against the human head and for spacing the electronics and the antenna away from the head while the electronics are in use, the spacer easel rotating about 270° around a hinge on a top of the cellular telephone for a closed position along one side of the cellular telephone to an open position about 90° from an opposite side of the phone when the cellular telephone is in use for talking and listening by a user.

11. The apparatus of claim 10, wherein the spacer easel is hinged at a top of the case.

12. The apparatus of claim 10, wherein the spacer easel is hinged at a bottom of the case.

13. The apparatus of claim 10, wherein the spacer easel is hinged at a side of the case.

14. The apparatus of claim 10, wherein the spacer easel is hinged at a back of the case.

15. The apparatus of claim 14, wherein the speaker and the microphone are mounted on the back of the case; and
wherein the control keys are mounted on a front of the case for facing away from the human head when the electronics are in use.

16. The apparatus of claim 15, further comprising a display screen mounted on the back of the case for displaying information to the user.

17. The apparatus of claim 16, further comprising a smaller conventional data display mounted on the front of the case near the control keys.

18. Telephone apparatus comprising:
a hand held case made of biodegradable conductive plastic;
an antenna mounted on the case;
electronics mounted within the case;
control keys mounted on one surface of the case for controlling the electronics within the case;
a speaker mounted on the case and a microphone mounted on the case for respectively converting electronic signals to sounds and vice versa;
conductive plastic shielding material on surfaces of the case for protecting users and the electronics from radiation;
a spacer easel rotating about 270° around a hinge on a top of the cellular telephone for a closed position along one side of the cellular telephone to an open position about 90° from an opposite side of the phone when the cellular telephone is in use for talking and listening by a user.

19. The apparatus of claim 18, further comprising elastomeric grips mounted on side or top and bottom surface of the case for holding the case and protecting the case and its contents.

20. Telephone apparatus comprising:
a hand held case made of biodegradable conductive plastic;
an antenna mounted on the case;
electronics mounted within the case;
control keys mounted on one surface of the case for controlling the electronics within the case;
a speaker mounted on the case and a microphone mounted on the case for respectively converting electronic signals to sounds and vice versa;
wherein the case has front and rear opposite faces, a display on the front face of the case near the control keys, and a second display on the rear face;
a spacer easel rotating about 270° around a hinge on a top of the cellular telephone for a closed position along one side of the cellular telephone to an open position about 90° from an opposite side of the phone when the cellular telephone is in use for talking and listening by a user.

* * * * *

UNITED STATES PATENT AND TRADEMARK OFFICE
CERTIFICATE OF CORRECTION

PATENT NO. : 7,386,121 B1
APPLICATION NO. : 09/906851
DATED : June 8, 2010
INVENTOR(S) : Victor Rivas Alvarez It is certified that error appears in the above-identified patent and that said Letters Patent is hereby corrected as shown below:

Title Page, Item (12) "Rivas" should read --Rivas Alvarez--.

Title Page, Item (76) Inventor, "Victor A. Rivas" should read --Victor Rivas Alvarez--.

Signed and Sealed this
Twenty-ninth Day of November, 2011

David J. Kappos
*Director of the United States Patent and Trademark Office*